June 2, 1959     O. GEBHARDT     2,888,788
APPARATUS FOR AND METHOD OF EVACUATING SEALED PACKAGES
Filed March 14, 1957     3 Sheets-Sheet 1
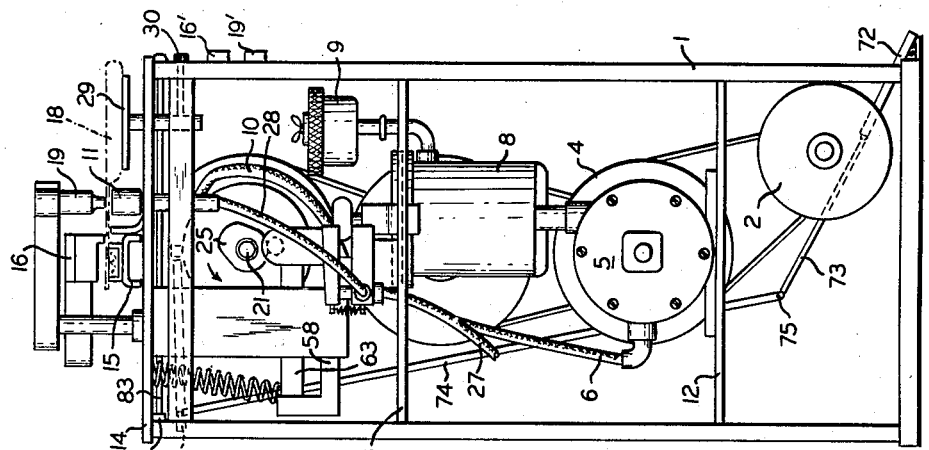
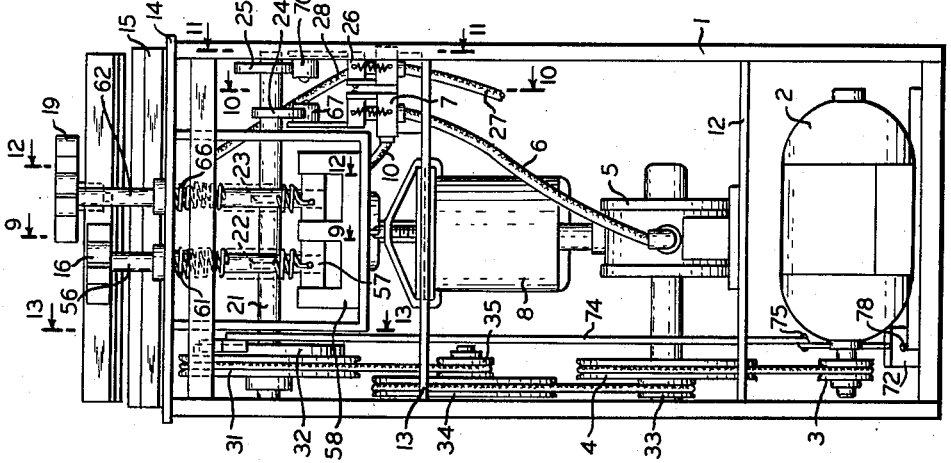
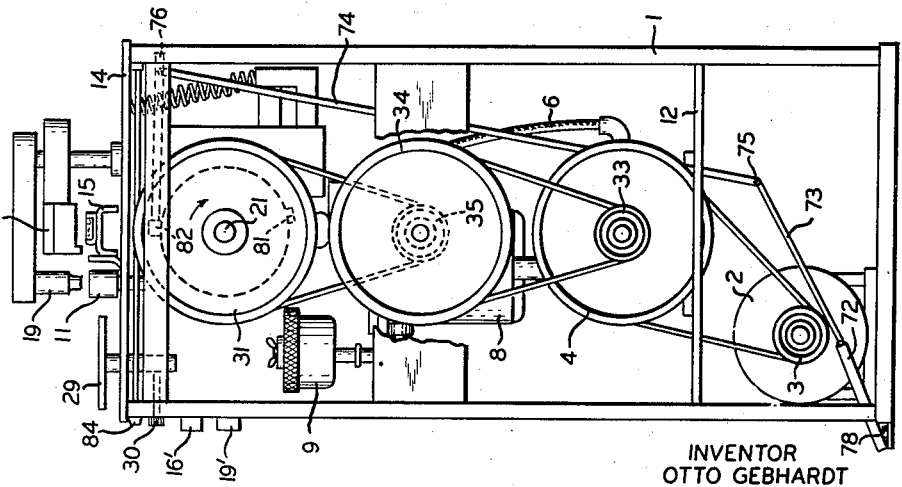
INVENTOR
OTTO GEBHARDT
BY
ATTORNEY.

INVENTOR
OTTO GEBHARDT
BY
ATTORNEY.

June 2, 1959   O. GEBHARDT   2,888,788
APPARATUS FOR AND METHOD OF EVACUATING SEALED PACKAGES
Filed March 14, 1957   3 Sheets-Sheet 3

INVENTOR
OTTO GEBHARDT
BY
ATTORNEY.

United States Patent Office 2,888,788
Patented June 2, 1959

2,888,788
APPARATUS FOR AND METHOD OF EVACUATING SEALED PACKAGES

Otto Gebhardt, Fort Lee, N.J.

Application March 14, 1957, Serial No. 645,994

9 Claims. (Cl. 53—22)

The present invention relates to a machine for evacuating previously sealed packages having a flexible wrapper of which at least the inner surface is heat-sealable.

Food products and other commodities are marketed in flexible sheet material made of moisture-impervious plastics or the like. Some of the products marketed in such material are adversely affected by their exposure to air for an appreciably long time, but retain their desired characteristics if maintained in a wrap from which the air has been evacuated or which is filled after evacuation with a neutral gas. Different methods and devices have been resorted to in order to evacuate the bag-like packages after inserting into the bags the food products or other commodities. In accordance with one procedure the bags containing the products have been fed to a vacuum chamber and upon sealing the chamber the air has been evacuated therefrom and upon achieving a predetermined value of such vacuum in the chamber, the bag which has likewise been subjected to the vacuum is sealed off by heat sealing means. Other methods have been proposed in which the bag is completely closed after inserting the products therein and a hole is then punched through the bag through which hole the air of the bag is evacuated, whereupon the area of the bag surrounding said hole is sealed off and the bag thus maintained "in vacuo."

An apparatus for and a method of evacuating sealed packages or bags has been disclosed in the copending patent application Serial No. 606,002, filed August 24, 1956, which applies the principle of punching a hole through one sheet of the bag by means of a knife disposed in the suction line, so that the punching of the hole is brought about by the suction effect applied to the bag. While this apparatus and this method was found an appreciable improvement over the devices of the prior art, in some instances the two opposing sheets of the bag did not separate completely or fast enough, in order to achieve the desired vacuum in the bag in the short time period available for the vacuum step, particularly in machines which have been designed for fast operations.

It is, therefore, one object of the present invention to provide an apparatus for evacuating a sealed package in such manner that a knife blade is mounted for axial movement in a suction head at the end of a suction line adjacent a finger-like member immovably mounted in said suction head and in which the knife blade, which at first projects over the outer end of the finger-like member is withdrawn into the suction head due to the suction effect after piercing one sheet of the bag, whereupon the finger-like member spreads apart the two opposite sheets of the bag and permits evacuation thereof within a very short time.

It is another object of the present invention to provide an apparatus which comprises in addition to a knife blade axially movably mounted in a suction head, a finger-like member which is immovably mounted in the suction head and is equipped with a longitudinal bore to be connected with a feeding line for an inert gas, as for instance nitrogen, the finger-like member being positioned at first behind the pointed end of the knife blade and projecting over the knife blade when the latter reaches its rearmost position brought about by the suction effect from the suction line, and the finger-like member projecting through the hole formed by the knife blade in one sheet of the bag and spacing apart the two opposite sheets to permit of a very fast evacuation of the air contained in the bag and upon finishing the evacuation step feeding of a neutral gas into the bag through perforations provided in the finger-like member just prior to providing a ring seal around the opening previously formed in the bag by the knife blade.

It is yet another object of the present invention to provide a method of evacuating a bag of plastic or similar material containing commodities comprising the steps of piercing one of the two oppositely disposed sheets of a bag or the like, evacuating air contained in the bag through the hole of said one sheet formed by the knife blade, spacing apart the two opposite sheets during the evacuation step and providing a ring seal around the portion of the bag which has been pierced before.

It is still a further object of the present invention to provide a method of evacuating a bag or the like of plastic or similar material which comprises the steps of piercing one of the two oppositely disposed sheets of a bag or the like, evacuating air disposed in said bag, spacing apart the two oppositely disposed sheets during the evacuation step and feeding of a neutral gas into said bag immediately after termination of the evacuation step, and finally providing a ring seal around the pierced portion of said bag.

With these and other objects in view which will become apparent in the following detailed description, the present invention will be clearly understood in connection with the accompanying drawings, in which:

Figure 1 is a rear elevation of the entire apparatus, the cover plates being removed in order to disclose the operative parts thereof;

Fig. 2 is an end view of the apparatus seen from the right of Fig. 1;

Fig. 3 is an end view of the apparatus seen from the left of Fig. 1;

Figure 4:
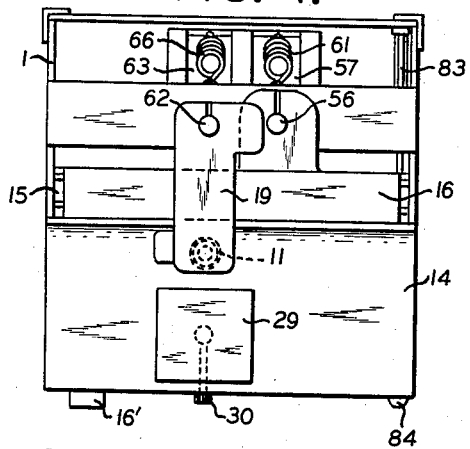
Fig. 4 is a top plan view thereof.

Referring now to the drawings, and in particular to Figs. 1 to 3, the apparatus comprises a frame 1 supporting preferably at its base an electric motor 2 which over pulleys 3 and 4 or the like operates a pump 5, the suction side of which is connected by means of a hose 6 or any suitable line to a valve member 7. The pressure side of the pump 5 is connected with an oil container 8 and the latter is in connection with a filter muffler 9.

The other end of the valve member 7 has secured thereto one end of another hose 10 which leads to a suction head 11, the structure of which will be set forth below.

Cross beams 12 and 13 are arranged in the frame 1 for support of the pump 5 and the oil container 8, respectively. The suction head 11 is supported in a top plate 14 carried by the frame 1, preferably by screwing the suction head 11 into the top plate 14.

Figure 5:
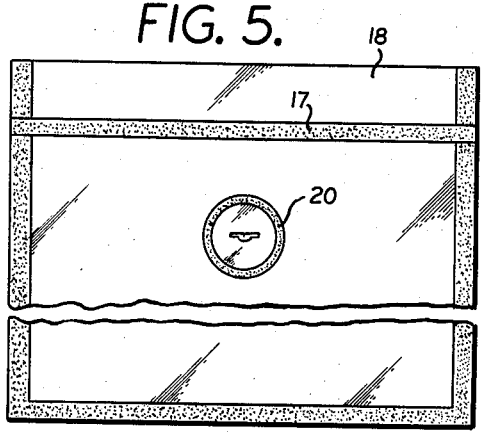
Fig. 5 is a top plan view of a bag indicating the sealing portions.

A longitudinal sealing element 15 is also mounted on the top plate 14 which cooperates with a complementary heat sealing member 16 adapted to perform a reciprocating movement towards and from the sealing element 15, in order to provide a longitudinal sealing strip 17 (Fig. 5) at the open end of the bag or the like 18. A member 19 complementary to the suction head 11 is disposed above the plate 14 opposite the suction head 11 to perform a reciprocating movement towards and from the suction head 11 by means to be described below. The suction head 11 combined with the complementary member 19 is adapted to achieve, after previous piercing of one sheet of the bag and after evacuation of the air therefrom, a ring seal 20 (Fig. 5).

In the upper portion of the frame 1 is also properly supported a cross shaft 21 which has keyed thereto the cams 22, 23, 24 and 25, the cam 22 being adapted to bring about reciprocating movement of the complementary member 16 of the longitudinal heat sealing element 15, the cam 23 being adapted to bring about the reciprocating movement of the complementary heat sealing member 19 of the suction head 11, the cam 24 being adapted to operate the valve member 7 at predetermined time intervals and the cam 25 being adapted to operate a second valve member 26 which is connected at one side with a feeding hose 27, while its other end has connected thereto a second feeding hose 28 leading to a finger-like member immovably mounted in the suction head 11 which finger-like member will be described below, both feeding hoses 27 and 28 serving the purpose of feeding a neutral gas through perforations provided in the finger-like member into the bag 18 after the evacuation step is terminated, just prior to applying the ring seal 20 thereto, which feeding of neutral gas is controlled by the cam operated valve member 26.

The top plate 14 of the frame 1 carries also a horizontally disposed and vertically adjustable plate 29, which may be retained in any of its adjusted vertical positions by means of a set screw 30. The plate 29 is adapted to support smaller types of bags containing a lesser number of commodities in order to mount these bags at a predetermined height in relation to the suction head 11.

The shaft 21, to which the cams 22, 23, 24 and 25 are keyed, carries at one end a pulley 31 by means of a friction coupling 32, so that the continuous rotation of the pulley 31 is transferred to the shaft 21 during predetermined time intervals upon setting the coupling 32 into coupling position. The pulley 31 is driven by a reduction gear or reduction pulleys 33, 34 and 35.

The heat sealing means are substantially of conventional nature including electrically operated heating means and since the temperature required for the longitudinal seal 17 is different from that required for the ring seal 20, individual thermostats 16' and 19' control the desired sealing temperature of the elements 16 and 19, respectively.

Figure 6:
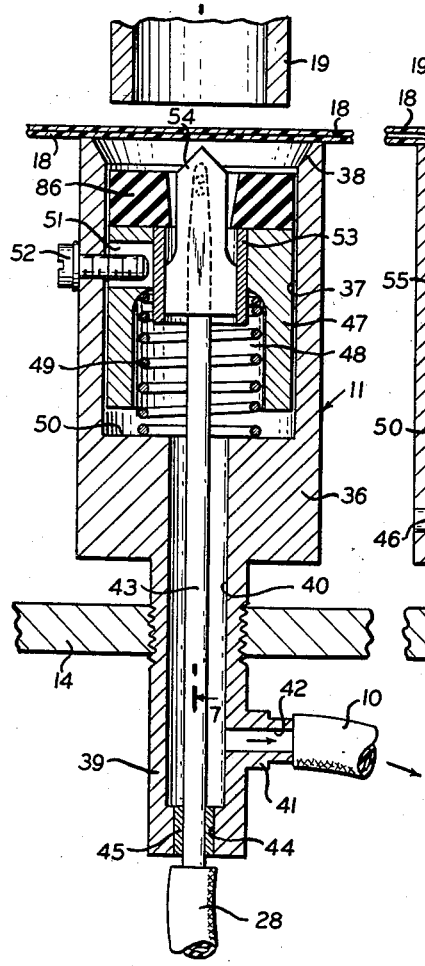
Fig. 6 is a section through the suction head of the apparatus.
Figure 7:
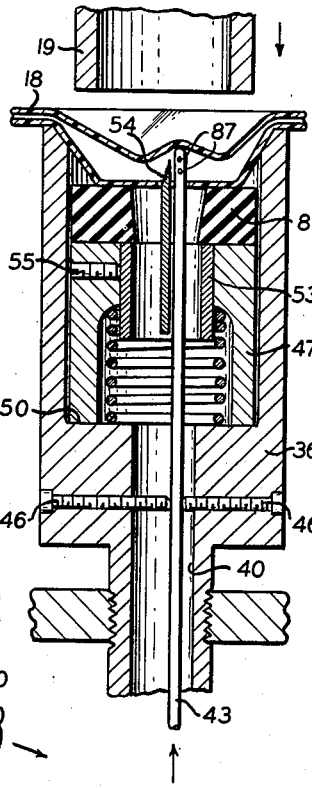
Fig. 7 is a section along the lines 7—7 of Fig. 6.
Figure 8:
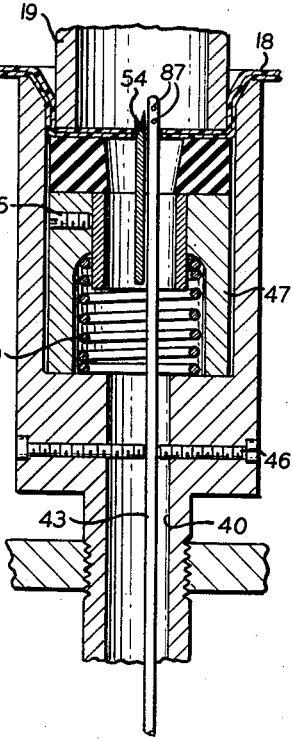
Fig. 8 is a section similar to that shown in Fig. 7, yet in an advanced operative position.

Referring now to Figs. 6 to 8, the suction head 11 comprises a hollow cylindrical body 36 which has an inner cylindrical face 37, the upper end of which is conically tapered outwardly to form a conical end face 38. The bottom of the cylindrical body 36 has an axial projection 39 which is equipped with a bore 40 communicating with the chamber defined by the cylindrical body 36 and the axial projection 39 is closed at its lower end. A flange connection 41 projects laterally from the periphery of the axial projection 39 which flange connection has a bore 42 communicating with the bore 40 of the axial projection 39 and receives one end of the suction hose line 10, so that the bore 40 and the chamber defined by the cylindrical body 36 may be subjected to a suction effect, when the hose line 10 is connected with the suction side of the pump 5.

A finger-like member 43 extends through a bore 44 arranged in the bottom of the axial projection 39 through proper packing means 45 longitudinally through the bore 40 into the chamber defined by the cylindrical body 36. The top end of the hollow finger-like member 43 is equipped with one or more perforations 87 which connect the channel-like bore of the finger-like member 43 with the inside of the bag 18 so that an inert gas may be fed through the perforations 87 of the finger-like member 43 into the bag 18. In order to maintain the finger-like member 43 at a predetermined height in the cylindrical body 36, a set screw 46 is provided in the bottom of the cylindrical body 36. A hollow cylindrical member 47 complementary to the chamber defined by the cylindrical body 36 is inserted into the latter, the inner recess 48 of which receives a comparatively weak helical spring 49 one end of which engages the bottom face 50 of the chamber defined by the cylindrical body 36 and the other end of the helical spring 49 engages an inner face 51 of the hollow cylindrical member 47, so that the helical spring 49 has a tendency to raise the hollow cylindrical member 47 into its uppermost position. The hollow cylindrical member 47 is also equipped with a slot 51 extending in axial direction from its periphery into the spaced defined by the recess 48. The slot 51 is closed at its top and at its bottom and is adapted to receive a guide screw 52 properly threaded through the cylindrical body 36 and terminating short of another cylindrical member 53 in which a knife blade 54 is fixedly mounted. A set screw 55 retains the cylindrical member 53 and thereby the knife blade 54 in predetermined position. It is apparent that the hollow cylindrical member 57 together with the cylindrical member 53 and the knife blade 54 are permitted to perform axial movements in downward direction against the force of the spring 49, which axial movements are limited by the axial length of the slot 51.

Figure 9:
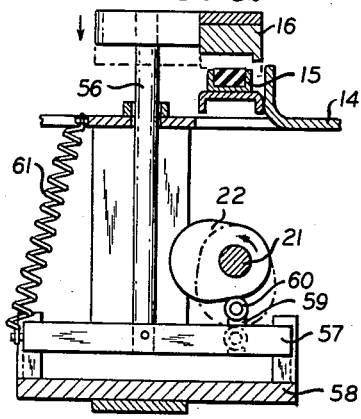
Fig. 9 is a section along the lines 9—9 of Fig. 1.
Figure 13:
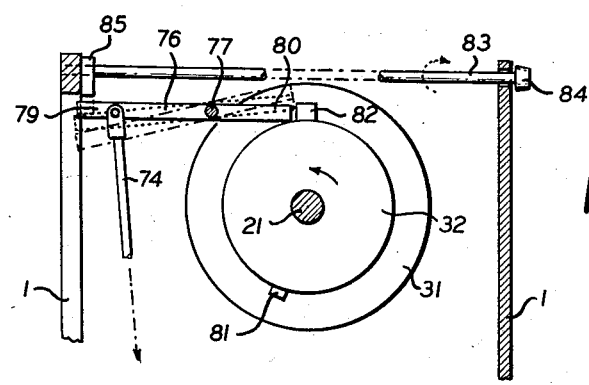
Fig. 13 is a section along the lines 13—13 of Fig. 1.

Referring nows to Figs 9 and 13, the drives for the longitudinal and ring sealing means as well as for operation of the valves for the suction line and for the feeding of a neutral gas during predetermined time intervals, and finally also the switching means for automatic and manual operation, respectively, are disclosed.

As clearly shown in Fig. 9, the longitudinal sealing element 15 cooperates with a complementary heat sealing element 16, which is mounted, as previously stated, for reciprocating movement towards and from the sealing element 15. In order to achieve this end the complementary heat sealing element 16 is supported by a rod 56 which projects through the top plate 14, the latter forming a guide for the rod 56 and the lower end of the rod 56 is secured to a horizontally disposed cross bar 57 which finds a guide in the casing 58, permitting vertical reciprocating movement for the cross bar 57 therein. A lug member 59 projects from the upper face of the cross bar 57, which lug member 59 carries a follower roller 60 which is adapted to engage the cam 22 which is keyed to the shaft 21. A helical compression spring 61, one end of which is secured to the top plate 14 and the other end to the cross bar 57, tends to retain the latter in its uppermost position, that means the complementary heat sealing member 16 also in inoperative position. Upon turning the cam 22 together with the shaft 21 at predetermined time intervals, the complementary heat sealing member 16 is lowered to the sealing element 15 against the force of the spring 61 and upon continued rotation of the cam 22 the cross bar 57 returns again to its uppermost position due to the effect of the spring 61 and raises simultaneously the complementary heat sealing member 16 again into inoperative position.

Figure 12:
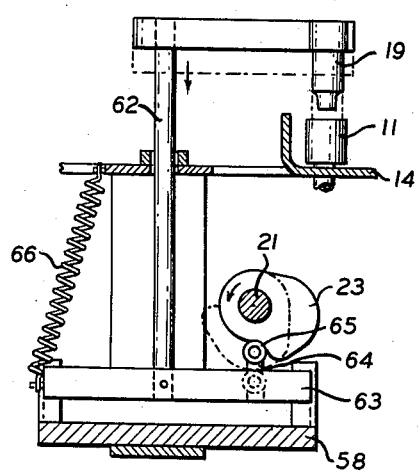
Fig. 12 is a section along the lines 12—12 of Fig. 1.

As clearly shown in Fig. 12, an arrangement similar to that shown in Fig. 9, is disclosed for the sealing means in conjunction with the suction head 11. As previously stated, the suction head 11 is mounted in and preferably screwed into the top plate 14 and the complementary member 19 is disposed opposite the suction head 11 for reciprocating vertical movement. In order to achieve this end, the complementary member 19 is secured to a rod 62 which projects through the top plate 14 and the lower end thereof is secured to a cross bar 63 which finds its guide in the casing 58. The cross bar 63 reciprocates in the casing 58 and for this purpose is equipped with a lug member 64 which carries a follower roller 65 for engagement with the cam 23 keyed to the shaft 21 to turn therewith. A helical compression spring 66, one end of which is secured to the top plate 14 and its other end to the cross bar 63, urges the cross bar 63 and, thereby, the rod 62 and the complementary member 19 in the uppermost position. Upon turning the cam 23, the cross bar 63, and, thus, also the complementary member 19 is lowered and due to the lowering step the bag which was placed between the suction head 11 and the complementary member 19 is pierced, the air evacuated therefrom and a heat ring seal provided around the pierced point of the bag.

Figure 10:
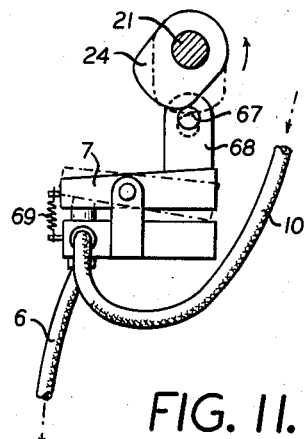
Fig. 10 is a section along the lines 10—10 of Fig. 1.
Figure 11:
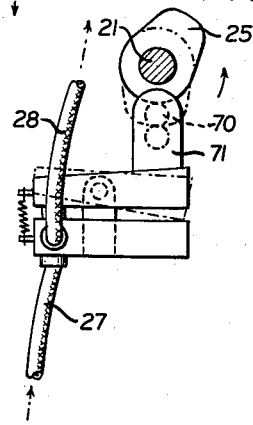
Fig. 11 is a section along the lines 11—11 of Fig. 1.

Since it is of advantage to submit the suction head 11 to a suction effect only at predetermined time intervals and also to feed inert gas into the bag likewise at predetermined time intervals through the finger-like member 43, the suction cycle being in predetermined relation with the inert gas feeding cycle, proper valve means are provided in the suction line and the inert gas feeding line, respectively, as shown by example in Figs. 10 and 11.

Referring now to Fig. 10, which shows in a fragmentary view a portion of the suction line and in particular a hose 6 or the like leading from the pump 5 to the valve member 7 of any suitable structure, the latter may be operated by the cam 24 keyed to the shaft 21 and engaging a follower roller 67 mounted on a projection 68 of the valve member 7. It is to be understood of course that any other suitable valve member may be used in this apparatus. While the cam 24 urges the valve member 7 into open and operative position in which the hose 6 is connected with the hose 10 leading to the suction head 11, a helical spring 69 returns the valve into closed and inoperative position.

Referring now to Fig. 11, it will be seen that a similar valve arrangement is provided for the line feeding a neutral gas into the bag after it has been evacuated. Fig. 11 shows the hose 27 or the like leading into the valve member 26 which carries also a follower roller 70. The latter engages the cam 25 and is mounted on a projection 71 of the valve member 26 and a hose 28 leads from the valve member 26 to the finger-like member 43. The cams 24 and 25 keyed to the shaft 21 are disposed angularly relative to each other in such manner that the closing of the valve member 26 follows closely the opening of the valve member 7.

Since bags or packages of different size may be evacuated and sealed by the same apparatus it may be required to switch from automatic operation to manual operation because the larger bags or packages may not be completely evacuated during the automatically set cycle of operation. In order to achieve this end the friction coupling 32 is equipped with means for such switching from automatic to manual operation. As clearly shown in Figs. 2 and 3 a foot pedal 72 is pivotally mounted at the bottom of the frame 1. The pedal 72 is connected with a link 73 and the latter with a link 74 by means of a pivot 75. The upper end of the link 74 is pivotally connected with a double-armed lever 76 mounted on the pivot 77 and spring means 78 provided on the pedal 72 tend to keep the latter and, thereby, the outer arm 79 of the lever 76 in its uppermost position and, thereby, the inner arm 80 in its lowermost position. The friction coupling member 32 has mounted at its periphery two projections 81 and 82 and the projection 82 extends radially beyond that of the projection 81. A shaft 83 is rotatably mounted in the frame 1 and projects from the front to the rear of the apparatus. The front end of the shaft 83 carries a knob 84 in order to manually turn the shaft 83. The rear end of the shaft 83 carries a disc 85 eccentrically mounted on the shaft 83 opposite the rear end of the outer arm 79 of the lever 76 to operate as abutment means against the outer arm 79. If the disc 85 is in such position that the portion having a smaller radius is disposed opposite the outer arm 79, the latter can assume a higher position than is possible, if the portion of the disc 85 having the greater radius is disposed opposite the outer arm 79. In the former situation due to the effect of the spring 78, the outer arm 79 will assume a higher position and abut during rotation of the pulley 71 and the friction coupling 32, the projection 81, as well as the projection 82. In the latter situation, however, the outer arm 79 cannot achieve the previously high position and will not be able to abut against the projection 81, but only the projection 82, which permits of automatic operation through an entire cycle of the apparatus. In order to provide manual operation it is thus necessary to turn the shaft 83 by means of the knob 84 in such manner that the outer arm 79 of the lever 76 is disposed opposite that portion of the disc 85 having the smaller radius.

The operation of the present apparatus takes place in the following manner:

Upon closing the motor circuit the pump 5 is subjected to continuous operation, yet since the valve members 7 and 26 are normally in closed position, the suction head 11 will not be connected with the suction side of the pump, and the finger-like member will not be connected with the source of the inert gas, which may be by example a pressure cylinder. Due to the friction coupling 32, the member thereof driving the shaft 21 will operate only in cycles in accordance with the foot operated lever 76 which upon such foot operation releases the friction coupling member 32 for rotation together with the shaft and performs a rotation of 360° in one complete cycle simultaneously operating in timely arrangement the longitudinal sealing means and then the ring sealing means and between these two sealing steps the properly set cams 24 and 25 will connect the suction head 11 with the suction side of the pump 5 and also immediately upon disconnection of the suction head 11 from the suction side of the pump 5 bring about connection with the feeding line for the inert gas into the finger-like member 43 disposed in the suction head 11 for feeding an inert gas into the bag 18. If no inert gas is required the finger-like member 43 functions merely as a means for spacing apart the two oppositely disposed sheets of a bag or the like in order to reduce the time required for evacuating all the air from the bag and also to assure that no air pockets remain in the bag from which the air has not been evacuated.

In order to seal a bag, package or the like 18, into which a commodity has been inserted before, the bag is first placed either onto the top plate 14 or the special plate 29 previously adjusted to the size of the bag, whereupon within the given cycle the longitudinal seal 17 is first made by means of lowering the complementary member 16 due to operation of the cam 22 (Fig. 9). Immediately thereafter another portion of the bag 18 which is disposed on top of the suction head 11 is subjected to the suction effect so that the sheets of the bag 18 change from the position shown in Fig. 6 into that shown in Fig. 7. The lower sheet of the bag 18 is pulled into the small chamber defined on top of the suction head 11 by the conical upper face 38 thereof and since in this position the knife blade 54 projects over the finger-like member 43, the knife blade 54 will penetrate to the inside of the bag. Due to the suction effect of the hollow cylindrical member 47 will perform a downward stroke against the force of the spring 49, which must be made of such strength that it does not resist this downward movement of the hollow cylindrical member 47 against the suction force, to assume the position shown in Fig. 7, thereby simultaneously compressing the spring 49. Due to the downward stroke of the hollow cylindrical member 47, the knife blade, which is mounted therein, is likewise lowered so that its sharp upper point is now disposed below the upper end of the immovably mounted finger-like member 43. The finger-like member 43 will push through the hole pierced by the knife blade 54 and will now raise and space apart the upper sheet of the bag 18 from its lower sheet. The lower sheet will be pulled in slightly further into the upper chamber defined by the upper end of the suction head 11 and will engage a ring member 86 mounted on top of the hollow cylindrical member 47, which ring member 86 is made of rubber or other similar suitable material. The ring member 86 joins the downward stroke of the hollow cylindrical member 47. Since the finger-like member 43 spaces apart the two sheets of the bag 18, all the air is evacuated from the bag 18 in the shortest possible time simultaneously preventing any air pockets. In properly timed cooperation the complementary member 19 is then lowered, which functions as a heat sealing member, and provides a heat sealing ring which is achieved easily in the position shown in Fig. 8. If an inert gas is to be fed to the bag 18, prior to the sealing step by operation of the cam 25, the finger-like member 43 which is equipped with an axial bore terminating into one or more perforations 87 feeds inert gas into the bag which is retained therein upon providing the ring seal by means of the complementary member 19. Upon withdrawal of the complementary member 19 by means of the spring 66 and disconnecting the suction line 6 from the suction line 10 by opening the valve member 7, the hollow cylindrical member 47 will be lifted again by operation of the spring 69 into the position shown in Fig. 6 and upon insertion of the next bag the same cycle can be repeated again.

While I have disclosed one embodiment of the present invention, it is to be understood that this embodiment is given by example only and not in a limiting sense, the scope of the invention being determined by the objects and the claims.

I claim:

1. A method of evacuating a sealed package formed of two oppositely disposed flexible sheets capable of being heat-sealed and of sealing said package, comprising the steps of piercing one of said two sheets by causing said one of the two sheets to move towards a knife by suction, exhausting air from said package through said pierced opening provided in said one of said two sheets by said suction, simultaneously, withdrawing said knife by said suction, holding the other of said two sheets in spaced apart position from said one of said two sheets during said air exhausting step, and heat fusing together said two sheets in an area surrounding said pierced portion of said one of said two sheets.

2. An apparatus for evacuating a sealed package formed of two oppositely disposed sheets capable of being heat sealed and for sealing said package comprising a frame, a heat sealing device carried by said frame and having two sections disposed opposite each other and movable towards each other, one of said sections constituting a suction head and adapted to position said sheets thereon, a vacuum producing means connected with said suction head, a knife means disposed in and reciprocatable in said suction head, and resilient means for urging said knife means into an outermost position in said suction head, said knife means being adapted to pierce one of said sheets upon subjecting said one sheet to a suction effect, a finger member disposed in said suction head adjacent said knife means and immovable relative to said suction head, the front end of said finger member being positioned below the front end of said knife means prior to subjecting said one sheet to the suction effect, means for withdrawing said knife means into said suction head to advance the front end of said finger member beyond the front end of said knife means, said finger member projecting through the opening formed by said knife means in said one sheet and engaging the inner face of the other of said sheets in order to space apart said two sheets during the evacuation process.

3. The apparatus, as set forth in claim 2, wherein said means for withdrawing said knife means into said suction head is operated by a suction force exerted on said knife means.

4. The apparatus, as set forth in claim 2, wherein said suction head constituting one of the sections of said heat sealing device, is fixedly secured to said frame and the other of said sections being mounted for reciprocating movement, and means for movement of the other of said sections into engaging sealing position with said one of said sections at predetermined time intervals.

5. A suction head forming one section of a heat sealing device for a package having two opposite sheets, comprising a first hollow cylindrical member defining a chamber, a second cylindrical member reciprocating in said first cylindrical member, a knife blade adjustably mounted in said second cylindrical member, resilient means in said first cylindrical member urging said second cylindrical member into uppermost position within said first cylindrical member, said second cylindrical member including means for limiting its axal movement in either direction, and a finger member disposed axially adjacent said knife blade through said first and second cylindrical members and immovably and adjustably secured to said first cylindrical member, said finger member being adapted to terminate behind the end of said knife blade in inoperative position and to extend beyond the end of said knife blade in operative position wherein said sheets are spaced apart, and the rear end of said first cylindrical member being connected with a suction line.

6. The suction head, as set forth in claim 5, wherein said second cylindrical member is withdrawn against the force of said resilient means upon application of the suction effect and said finger member projects through the opening pierced by said knife blade into one of said sheets into engagement with and spacing apart the other of said sheets.

7. The suction head, as set forth in claim 5, which includes a valve member disposed in said suction line, and means for closing said valve member at predetermined time intervals.

8. The suction head, as set forth in claim 5, wherein said finger member is hollow and a source of neutral gas is connected with the rear end of said hollow finger member by means of a feeding line.

9. The suction head, as set forth in claim 8, which includes a valve member disposed in said feeding line for neutral gas, and means for closing said valve member at predetermined time intervals.

References Cited in the file of this patent

UNITED STATES PATENTS

| | | |
|---|---|---|
| 2,281,187 | Waters | Apr. 28, 1942 |
| 2,649,234 | Taunton | Aug. 14, 1953 |